United States Patent
Zhong et al.

(10) Patent No.: US 12,118,728 B2
(45) Date of Patent: Oct. 15, 2024

(54) METHOD AND APPARATUS FOR PROCESSING A MEDICAL IMAGE

(71) Applicant: Siemens Healthineers AG, Forchheim (DE)

(72) Inventors: Xiaodong Zhong, Oak Park, CA (US); Vibhas S. Deshpande, Austin, TX (US); Marcel Dominik Nickel, Herzogenaurach (DE); Stephan Kannengiesser, Wuppertal (DE)

(73) Assignee: Siemens Healthineers AG, Forchheim (DE)

( * ) Notice: Subject to any disclaimer, the term of this patent is extended or adjusted under 35 U.S.C. 154(b) by 346 days.

(21) Appl. No.: 17/648,686

(22) Filed: Jan. 24, 2022

(65) Prior Publication Data

US 2022/0245817 A1 Aug. 4, 2022

(30) Foreign Application Priority Data

Feb. 2, 2021 (EP) ..................................... 21154839

(51) Int. Cl.
*G06T 7/00* (2017.01)
*G06V 10/36* (2022.01)
(Continued)

(52) U.S. Cl.
CPC ............ *G06T 7/0016* (2013.01); *G06V 10/36* (2022.01); *G06V 10/751* (2022.01);
(Continued)

(58) Field of Classification Search
CPC ......... G06T 7/0016; G06T 2207/20081; G06T 2207/20084; G06T 2207/30004; G06T 5/70; G06T 7/0012; G06V 10/36; G06V 10/751; G06V 10/7747; G06V 10/82; G06V 2201/03
See application file for complete search history.

(56) References Cited

U.S. PATENT DOCUMENTS

| 5,917,957 A | 6/1999 | Ichikawa |
| 10,684,340 B1 | 6/2020 | Zhong et al. |

(Continued)

OTHER PUBLICATIONS

Extended Search report in EP Application No. 21154839.1 dated Oct. 14, 2021, 17 pages.
(Continued)

*Primary Examiner* — Qian Yang

(57) ABSTRACT

A computer implemented method of processing a medical image is disclosed. The method includes receiving a medical image comprising a first plurality of pixels each having an initial pixel value. For each of the first plurality of pixels, a filtering operation is applied to the pixel to generate a filtered pixel value for the pixel based on the initial pixel values of pixels that surround the pixel in the medical image. For each of the first plurality of pixels, a comparison of the initial pixel value with the filtered pixel value is performed. The method comprises, for each of the first plurality of pixels, determining, based on the comparison, whether or not to categorize the pixel as an erroneous pixel; and for each of the first plurality of pixels for which it is determined to categorize the pixel as an erroneous pixel, categorizing the pixel as an erroneous pixel.

17 Claims, 5 Drawing Sheets

(51) Int. Cl.
  *G06V 10/75* (2022.01)
  *G06V 10/774* (2022.01)
  *G06V 10/82* (2022.01)

(52) U.S. Cl.
  CPC .......... *G06V 10/7747* (2022.01); *G06V 10/82* (2022.01); *G06T 2207/20081* (2013.01); *G06T 2207/20084* (2013.01); *G06T 2207/30004* (2013.01); *G06V 2201/03* (2022.01)

(56) References Cited

U.S. PATENT DOCUMENTS

| | | |
|---|---|---|
| 2003/0039402 A1 | 2/2003 | Robins et al. |
| 2005/0111751 A1 | 5/2005 | Avinash |
| 2016/0084929 A1 | 3/2016 | Dale et al. |
| 2016/0282433 A1 | 9/2016 | Kannengiesser et al. |
| 2020/0104720 A1 | 4/2020 | Bao et al. |
| 2022/0207682 A1* | 6/2022 | Koronel ........... G01N 21/95607 |

OTHER PUBLICATIONS

Hanafy M. Ali: "MRI Medical Image Denoising by Fundamental Filters"; In: High-Resolution Neuroimaging—Basic Physical Principles and Clinical Applications; Mar. 14, 2018 (Mar. 14, 2018), InTech, XP055844024.

Anonymous: "Image Processing Operator Approximation Using Deep Learning"; Matlab & Simuling Example—Mathworks, Deutschland; Oct. 21, 2020 (Oct. 20, 2020), XP055844651, Retrieved from the Internet: URL: https://web.archive.org/web/20201021054925/ https://de.mathworks.com/help/images/image-processing-operator-approximation-using-deep-learning.html (retrieved Sep. 27, 2021).

Milosevic, S. Vladimir et al: "A new method for restoration of still images in the presence of Gaussian and impulse noise"; Digital Signal Processing Procrrfings, 1997. DSP 97., 1997 13th International Conference On Santorini, Greece Jul. 2-4, 1997, New York, NY, USA, IEE, US; vol. 2, Jul. 2, 1997 (Jul. 2, 1997), pp. 897-887; XP010251170.

Jiayi, Chen et al: "Adaptive probability filter for removing salt and papper noises"; IET Image Processing, IET, UK; vol. 12, No. 6, Jun. 2018 (Jun. 2018), pp. 863-871; XP006081175.

Yokoo, Takeshi, et al. "Nonalcoholic fatty liver disease: diagnostic and fat-grading accuracy of low-flip-angle multiecho gradient-recalled-echo MR imaging at 1.5 T." Radiology 251.1 (2009): 67-76.

Dixon Thomas W., "Simple Proton Spectroscopic Imaging", Radiology, 1984, vol. 153, pp. 184-194.

Glover, G. H et al. "Three-Point Dixon Technique for True Water/Fat Decomposition with B0 Inhomogeneity Correction" Magnetic Resonance in Medicine, vol. 18, pp. 371-383, 1991.

Ma, Jingfei. "Dixon techniques for water and fat imaging." Journal of Magnetic Resonance Imaging: An Official Journal of the International Society for Magnetic Resonance in Medicine 28.3 (2008): 543-558.

Scott B. Reeder et al: "Quantitative Assessment of Liver Fat with Magnetic Resonance Imaging and Spectroscopy"; Journal of Magnetic Resonance Imaging 34; pp. 729-749, 2011.

Hussain, Hero K., et al. "Hepatic fat fraction: MR imaging for quantitative measurement and display—early experience." Radiology 237.3 (2005): 1048-1055.

O'Regan, Declan P., et al. "Liver fat content and T2*: simultaneous measurement by using breath-hold multiecho MR imaging at 3.0 T—feasibility." Radiology 247.2 (2008): 550-557.

Guiu, Boris, et al. "Quantification of liver fat content: comparison of triple-echo chemical shift gradient-echo imaging and in vivo proton MR spectroscopy." Radiology 250.1 (2009): 95-102.

Yokoo, Takeshi, et al. "Estimation of hepatic proton-density fat fraction by using MR imaging at 3.0 T." Radiology 258.3 (2011): 749-759.

Koken, P., H. Eggers, and P. Börnert. "Fast single breath-hold 3D abdominal imaging with water-fat separation." Proc Intl Soc Magn Reson Med. Vol. 15. 2007, p. 1623.

Yu, Huanzhou, et al. "Multiecho water-fat separation and simultaneous R2* estimation with multifrequency fat spectrum modeling." Magnetic Resonance in Medicine: An Official Journal of the International Society for Magnetic Resonance in Medicine 60.5 (2008): 1122-1134.

Zhong, Xiaodong, et al. "Liver fat quantification using a multi-step adaptive fitting approach with multi-echo GRE imaging." Magnetic resonance in medicine 72.5 (2014): 1353-1365.

Wood, John C., et al. "MRI R2 and R2* mapping accurately estimates hepatic iron concentration in transfusion-dependent thalassemia and sickle cell disease patients." Blood 106.4 (2005): 1460-1465.

Hankins, Jane S., et al. "R2* magnetic resonance imaging of the liver in patients with iron overload." Blood, The Journal of the American Society of Hematology 113.20 (2009): 4853-4855.

Hernando, Diego, et al. "Quantification of liver iron with MRI: state of the art and remaining challenges." Journal of Magnetic Resonance Imaging 40.5 (2014): 1003-1021.

* cited by examiner

METHOD AND APPARATUS FOR PROCESSING A MEDICAL IMAGE

PRIORITY CLAIM

This application claims the benefit of priority of European Patent Application No. 21154839.1, filed on Feb. 2, 2021, the entire contents of which are hereby incorporated by reference herein.

TECHNICAL FIELD

The invention relates to processing of a medical image.

BACKGROUND

Medical images, such as Magnetic Resonance (MR) images produced by Magnetic Resonance Imaging (MRI), are utilized as a powerful clinical diagnostic tool. Diagnosis of different pathologies or diseases is performed by radiologists based on the pixel intensity distribution and overall impression of medical images. For example, diagnosis may be based on different Magnetic Resonance (MR) image types generated by different MR pulse sequences. The tissue property changes caused by diseases or pathologies are reflected in the differences of the pixel intensities between the normal and abnormal tissues, which are read and interpreted by the radiologists.

Another example of a medical image is a biomarker map. A biomarker map is a medical image in which the pixel values represent the values of a specific biomarker of interest. Biomarker maps may be derived from medical imaging signals. For example, a known biomarker is Proton Density Fat Fraction (PDFF), which is used to evaluate fat overload for fatty liver diseases. The values of biomarkers change due to the tissue property changes caused by diseases, and they have the potential of sensitively reflecting early disease stages. A biomarker map allows the radiologists to appreciate the biomarker value distribution on the maps, e.g. with the reference to anatomical images.

Accordingly, the quality and appearance of medical images such as MR images and quantitative, e.g. biomarker, maps are important for clinical diagnosis.

The presence in medical images of erroneous pixels, i.e. those with pixel values that are not representative of the image subject, can distort medical images and hinder their reading by radiologists. A contributor to erroneous pixels in medical images is noise. For example, noise exists in both MR images and quantitative maps, and is often visually present. For example, the presence of noise can lead to snowy, mottled, grainy, salt-and-pepper or other texture appearance on MR images and maps, depending on the underlying MR physics, the types of MR pulse sequences, imaging protocols, reconstruction, post-processing and other factors. Serious noise can largely hinder the reading of medical images by radiologists, and prevent an accurate diagnosis.

It would be desirable to identify erroneous pixels in a medical image, for example so that their presence can be accounted for and/or to correct for erroneous pixels in medical images.

SUMMARY

In one embodiment, a computer implemented method of processing a medical image is provided. The method includes receiving a medical image comprising a first plurality of pixels each having an initial pixel value; for each of the first plurality of pixels, applying a filtering operation to the pixel to generate a filtered pixel value for the pixel based on the initial pixel values of pixels that surround the pixel in the medical image; for each of the first plurality of pixels, performing a comparison of the initial pixel value with the filtered pixel value; for each of the first plurality of pixels, determining, based on the comparison, whether or not to categorize the pixel as an erroneous pixel; and for each of the first plurality of pixels for which it is determined to categorize the pixel as an erroneous pixel, categorizing the pixel as an erroneous pixel.

Optionally, the method may further include generating a result image corresponding to the medical image. The result image may be generated by, for each of the first plurality of pixels of the medical image categorized as an erroneous pixel, replacing the initial pixel value with the filtered pixel value.

Optionally, generating the result image may include, for each of the first plurality of pixels not categorized as an erroneous pixel, using the initial pixel value of the pixel of the medical image as the pixel value of the corresponding pixel in the result image.

Optionally, the method may further include, for each of the first plurality of pixels of the medical image, using the pixel value of the corresponding pixel of the result image as a fixed parameter in a signal model applied to a medical imaging signal, the medical imaging signal being that on the basis of which the initial pixel value of the pixel in the medical image has been derived.

Optionally, the method may further include applying the method of generating the result image to a plurality of medical images thereby to generate a respective plurality of the result images; collating the plurality of medical images and the respective plurality of result images into a training data set in which each respective result image is associated with the respective medical image to which the result image corresponds; and using the training data set to train a neural network to estimate a said result image given a said medical image as input.

Optionally, the method may further include generating an erroneous pixel indicator image corresponding to the medical image. Generating an erroneous pixel indicator image may include, for each of the first plurality of pixels of the medical image categorized as an erroneous pixel, using a first given value as the pixel value of the corresponding pixel in the erroneous pixel indicator image; and, for each of the first plurality of pixels of the medical image not categorized as an erroneous pixel, using a second given value different from the first given value as the pixel value of the corresponding pixel in the erroneous pixel indicator image.

Optionally, the method may further include applying the method of generating the erroneous pixel indicator image to a plurality of medical images thereby to generate a respective plurality of the erroneous pixel indicator images; collating the plurality of medical images and the respective plurality of erroneous pixel indicator images into a training data set in which each respective erroneous pixel indicator image is associated with the respective medical image to which the erroneous pixel indicator image corresponds; and training a neural network, using the training data set, to estimate a said erroneous pixel indicator image given a said medical image as input.

Optionally, the comparison of the initial pixel value with the filtered pixel value includes calculating a difference between the initial pixel value and the filtered pixel value, and the determination of whether or not the pixel is to be categorized as an erroneous pixel by comparing a parameter indicative of the calculated difference to a threshold; and in response to the parameter being larger than the threshold, determining that the pixel is to be categorized as an erroneous pixel.

Optionally, the parameter indicative of the calculated difference includes the calculated difference as a proportion of the filtered pixel value.

Optionally, the method may further include, for each of the first plurality of pixels of the medical image: determining whether the initial pixel value is greater than or equal to the filtered pixel value; if the initial pixel value is greater than or equal to the filtered pixel value, then comparing a first said parameter indicative of the calculated difference to a first threshold; and if the initial pixel value is less than the filtered pixel value, then comparing a second said parameter indicative of the calculated difference to a second threshold.

Optionally, the first parameter is indicative of the initial pixel value less the filtered pixel value, and the second parameter is indicative of the filtered pixel value less the initial pixel value.

Optionally, the method may further include, for each of the first plurality of pixels, comparing both the initial pixel value and the filtered pixel value to a third threshold. The comparison of the initial pixel value with the filtered pixel value is performed responsive to the comparison of both the initial pixel value and the filtered pixel value to the third threshold in the case that at least one of the initial pixel value and the filtered pixel value is greater than the third threshold.

Optionally, the method may further include, responsive to the comparison of both the initial pixel value and the filtered pixel value to the third threshold in the case that both the initial pixel value and the filtered pixel value is less than or equal to the third threshold, determining that the pixel is not to be categorized as an erroneous pixel.

In another embodiment, an apparatus includes a processing system configured to perform the method of processing a medical image, as described herein.

In another embodiment, a computer program includes a set of instructions which, when executed by a computer, cause the computer to perform a method of processing a medical image, as described herein.

DETAILED DESCRIPTION

Figure 1:
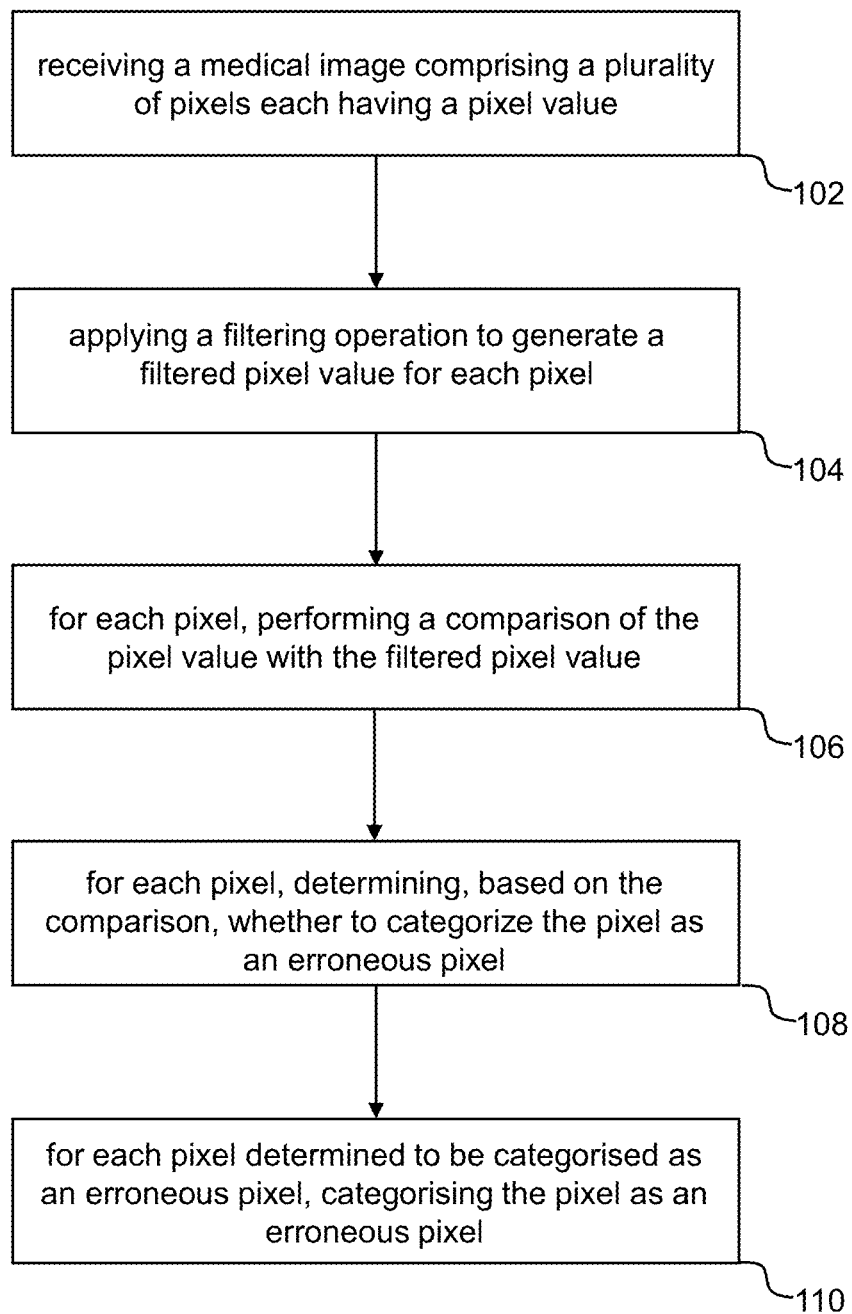
FIG. 1 is a flow diagram schematically illustrating a method of processing a medical image according to an example.

Referring to FIG. 1, there is illustrated a method of processing a medical image.

The method includes, in step 102, receiving a medical image comprising a first plurality of pixels each having an initial pixel value.

In some embodiments, the medical image may be an image obtained by performing medical imaging using a medical imaging scanner. For example, the medical imaging used to obtain the medical image may comprise Magnetic Resonance Imaging (MRI). As such the medical image may be a Magnetic Resonance (MR) image. In another embodiment, the medical imaging used to obtain the medical image may comprise ultrasound scanning or sonography, and the medical image may be an ultrasound image. Other example medical imaging techniques, such a Computed Tomography (CT) scanning, may be used to generate the medical image.

In some embodiments, the medical image may be a biomarker map. A biomarker map is a medical image in which the pixel values represent the values of a specific biomarker. The biomarkers may be derived from medical imaging techniques. A biomarker in the context of medical imaging is a measured or derived property which serves to indicate or 'mark' a biological state. The indicated state may, in turn, correlate with or be used to evaluate a disease or pathology. The values of biomarkers change due to the tissue property changes caused by diseases, and they have the potential of sensitively reflecting early disease stages. A biomarker map allows the radiologists to appreciate the biomarker value distribution on the maps, e.g. with the reference to anatomical images.

One example of a known biomarker is Proton Density Fat Fraction (PDFF), which may be used to evaluate fat overload for fatty liver diseases for example. Another example is 'R2*', which is used to evaluate iron overload in tissues, correlates well with liver iron concentration (LIC) and is useful for indicating diseases such as hemochromatosis and chronic-viral hepatitis. Certain other diseases alter fat or iron deposition in the tissue compared to normal conditions, and these biomarkers may be used for the quantitative measurement and evaluation of liver fat or iron deposition, and hence the corresponding disease, for example. The biomarker values are derived from imaging techniques. For example, R2* is an MRI specific property (specifically, it equates to the reciprocal of the spin relaxation rate). Fat fraction is not MRI specific, and may also be determined from, for example, Ultrasound or CT scanning techniques. Many diseases alter fat or iron deposition in the tissue compared to normal conditions. Other biomarkers may be derived from other imaging techniques and may be used to evaluate other tissue properties and/or diseases.

As mentioned, the medical image comprises a first plurality of pixels each having an initial pixel value. A pixel is a component part of the medical image, for example a two-dimensional digital image. The digital image may be contained or stored in a suitable image or file format, such a DICOM (Digital Imaging and Communications in Medicine) format. Each pixel is associated with a location within the medical image, for example as defined by x and y coordinates. Each pixel is associated with a pixel value. For example, the pixel value may be or represent a pixel intensity. For example, the pixel may be associated with a discrete intensity value on the scale of 0 to 4095, which is the regular range of the pixel value in DICOM images, as an example. The pixel value or intensity may be derived from a property measured or derived using a medical imaging technique. For example, in the case of MRI, the pixel value may represent R2*, i.e. the reciprocal of the spin relaxation rate, as measured for the particular portion of the subject to which the pixel corresponds. It will be appreciated that the medical image that is received in step 102 may be a sub-part or portion of a larger medical image that is captured or generated or derived. In this sense, it will be appreciated that the first plurality of pixels may represent less than all the pixels of a medical image of which the received medical image may form a part.

Figure 2:
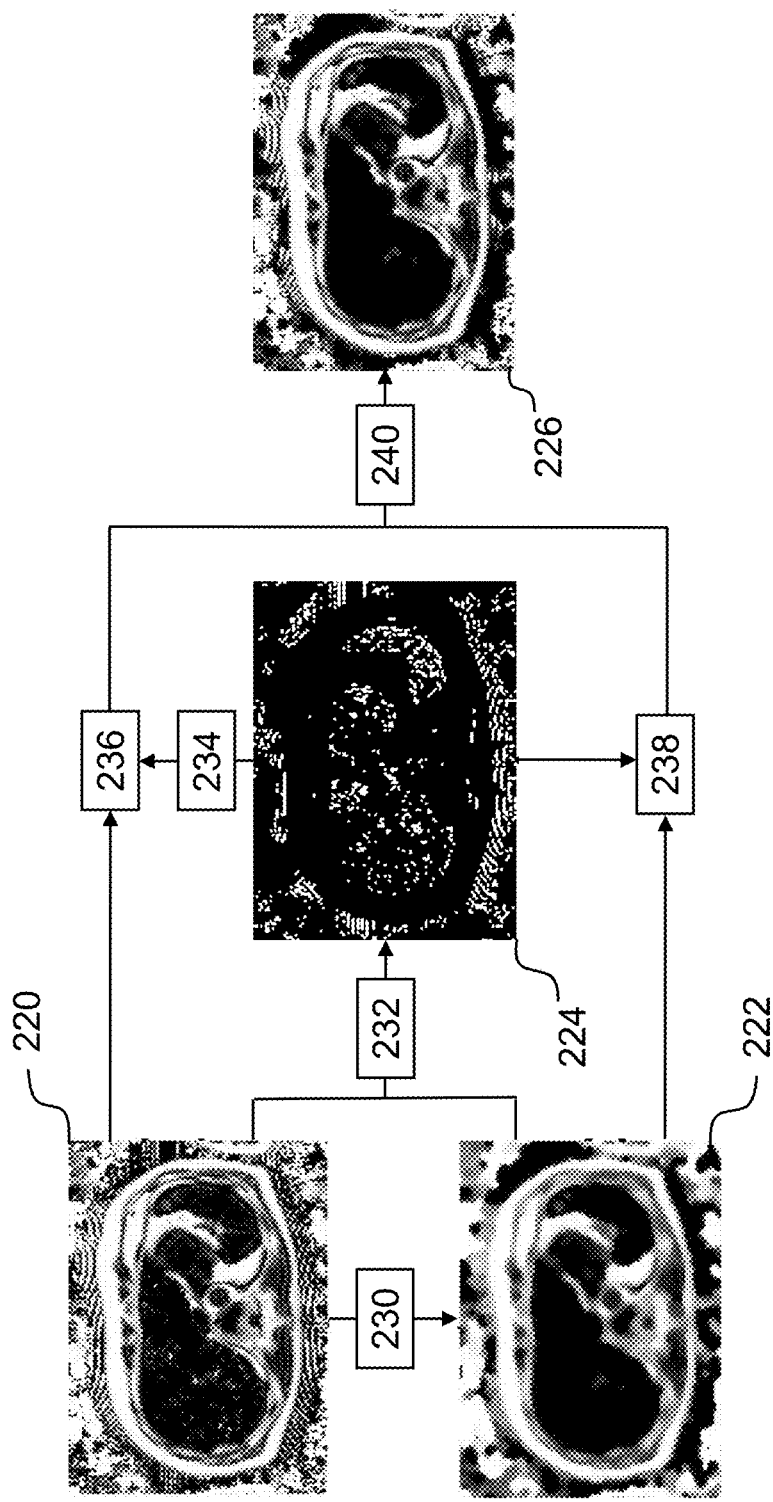
FIG. 2 is a flow diagram schematically illustrating an image processing flow according to an example.

An example of a medical image that may be received as part of step 102 is shown as 220 in FIG. 2. Specifically, the image shown in box 220 of FIG. 2 is a PDFF biomarker map, derived from MRI imaging, showing the Proton Density Fat Fraction of the abdomen region of a patient, with the liver being the organ of interest in this example. Other examples of a medical image that may be received can be seen in FIG. 3. Specifically, the top row of the table of FIG. 3, labelled 'Original', illustrates medical images derived from MRI (and are 'original' in the sense that in these images the adaptive filtering operation as described herein has not yet been applied). Specifically, from left to right in the sense of FIG. 3, the medical images are a PDFF biomarker map (showing the Proton Density Fat Fraction (PDFF) in the liver region of a patient), an R2* biomarker map of the same region (indicating iron concentration in the liver region), a Water image (showing the distribution of water in the region) and a Fat image (showing the distribution of fat in the region).

Returning to FIG. 1, the method includes, in step 104, for each of the first plurality of pixels, applying a filtering operation to the pixel to generate a filtered pixel value for the pixel. For each of the first plurality of pixels, the filtered pixel value is generated (e.g. may be calculated) based on the initial pixel values of pixels that surround the pixel in the medical image.

For example, for a given pixel having image x, y coordinates (P, Q), the filtered pixel value for the given pixel may be generated (e.g. calculated) based on the pixel values of the given pixel itself and the pixels that immediately surround the given pixel in the medical image, for example the eight pixels having the coordinates (P+1, Q−1), (P+1, Q), (P+1, Q+1), (P, Q+1), (P, Q−1) (P−1, Q−1), (P−1, Q), (P−1, Q+1). In this example, the neighbor size M is 1, i.e. the pixel values that are used are those of the nearest neighbors of the given pixel, i.e. those that are immediately adjacent to the given pixel. In some examples, a larger neighbor size may be used, for example M may be 2, in which case the filtered value for the given pixel is based on the pixel values of those pixels which are within 2 pixels (e.g. vertically, horizontally, and diagonally) from the given pixel. Other neighbor sizes may be used, although M=1 has been found to provide useful results whilst minimizing the number of pixels on which the filtering operation is based, hence minimizing computational load.

One example of a filter that may be used for the for the filtering operation is the median filter. For a given pixel, the median filter replaces the pixel value of the given pixel with the median of the pixel value of the given pixel and the pixel values of pixels that surround the given pixel in the medical image. Use of the median filter may be beneficial as it is known to preserve edges in an image, which may help preserve the sharpness of a result image resulting from the image processing as described below.

Other edge preserving filters may be used, such as the bilateral filter, which may provide for some noise-reduction. Another possible filter is the guidance filter, which uses a second image called guidance image to influence the filtering. The guidance filter may allow for a better, e.g. clearer, appearance near edges and may compute faster as compared to the bilateral filter. The median filter, the bilateral filter, and the guidance filter are known in the art, and a full description of their operation is omitted. Nonetheless the following is noted.

The bilateral filter is a non-linear, edge-preserving, smoothing filter for images. For a given pixel, the bilateral filter replaces the pixel value of the given pixel with a weighted average of the pixel values of pixels that surround the given pixel in the medical image. For example, the weight may be provided based on a Gaussian distribution. For example, the further the pixel is from the given pixel, the less weight the pixel value is given in the calculation.

The guided filter is an edge-preserving, smoothing filter. The guided filter performs filtering on one image using the content of a second, or guidance, image to influence the filtering. The guidance image may be the image itself, a different version of the image, or a different image. For example, when performing guided filtering on an R2* biomarker map as described above, the guidance image may be the corresponding PDFF biomarker map or the original echo-image (not shown) from which the R2* map is derived. For a given pixel in the medical image, the guided filter takes into account not only the pixel values of pixels surrounding the given pixel in the medical image, but also the statistics of a region in the corresponding spatial neighborhood in the guidance image, when generating the filtered pixel value. Other filters and filtering operations may be used to generate the filtered pixel value.

In some examples, for each of the first plurality of pixel values, the filtering operation may be applied a plurality of times to obtain the filtered pixel value. For example, the filtering operation may be applied to each pixel of the first plurality of pixels of the medical image. The filtering operation may then be applied again to the resulting image, and the pixel values resulting from that further application of the filtering operation may be taken as the filtered pixel values. In general, the filtering operation may be applied any number N of times. A value of N=3 has been found to provide useful results whilst allowing for reasonable processing times/load.

An example of a medical image the pixels of which a filtering operation as in step 104 has been applied, can be seen in medical image 222 of FIG. 2. Specifically, medical image 222 illustrates the medical image at 220 after a filtering operation as in step 104 has been applied to each of its pixels. That is, the image in box 222 is composed of filtered pixel values. In the specific example illustrated, the filter is a median filter with M=1 and N=3.

Returning to FIG. 1, the method includes, in step 106, for each of the first plurality of pixels, performing a comparison of the initial pixel value with the filtered pixel value. For example, the comparison of the initial pixel value with the filtered pixel value may comprise calculating a difference between the initial pixel value and the filtered pixel value.

The method includes, in step 108, for each of the first plurality of pixels, determining, based on the comparison, whether or not to categorize the pixel as an erroneous pixel; and, in step 110, for each of the first plurality of pixels for which it is determined to categorize the pixel as an erroneous pixel, categorizing the pixel as an erroneous pixel.

For example, as described in more detail below, the determination of whether or not the pixel is to be categorized as an erroneous pixel may include comparing a parameter indicative of the calculated difference between the initial pixel value and the filtered pixel value to a threshold (e.g. either a first or second threshold); and in response to the parameter being larger than the threshold, determining that the pixel is to be categorized as an erroneous pixel.

Erroneous pixels in medical images, such as those representing noise or other outliers, can be characterized by extreme changes in pixel value over short pixel distance (e.g. from one pixel to the next). This is particularly the case in medical images, as variations in the properties of biological materials occur on length scales much larger than that represented by adjacent or neighboring pixels. For example, liver disease is diffuse and relatively uniform over the liver (which may be represented by many thousands of pixels in a medical image), whereas noise can be characterized by extreme changes in pixel values over much shorter distances (e.g. from one pixel to the next). Such erroneous pixels can be reliably identified by comparing, for example, calculating a difference between, the initial pixel value and the filtered pixel value for a given pixel. For example, large differences between a pixel value and the pixel value of surrounding pixels represent e.g. noise and hence an erroneous pixel, and moreover will be reflected in the comparison of the initial and filtered pixel values of the pixel. Erroneous pixels, such as those representing noise, may therefore be identified in a medical image and categorized as such. Accordingly, the method provides for the identification of erroneous pixels in a medical image, for example so that their presence can be accounted for.

As described in more detail below, the categorization of pixels of a medical image as erroneous pixels, as provided for by the method, can be put to many different uses having many different advantages. For example, as described in more detail below, the categorization of erroneous pixels as provided can be used to generate corrected (e.g. noise-reduced) images which can be clearer for a radiologist to interpret, allow for more stable parameter fitting, and/or allow for training of a neural network to reduce erroneous pixels (e.g. noise) in medical images. As another example, the categorization of erroneous pixels as provided may be used to generate an erroneous pixel map, which can allow for training of a neural network to identify erroneous pixels (e.g. noise) in medical images. By providing for the reliable identification of erroneous pixels in a medical image, the method may allow for these uses and associated advantages to be realized.

Figure 4:
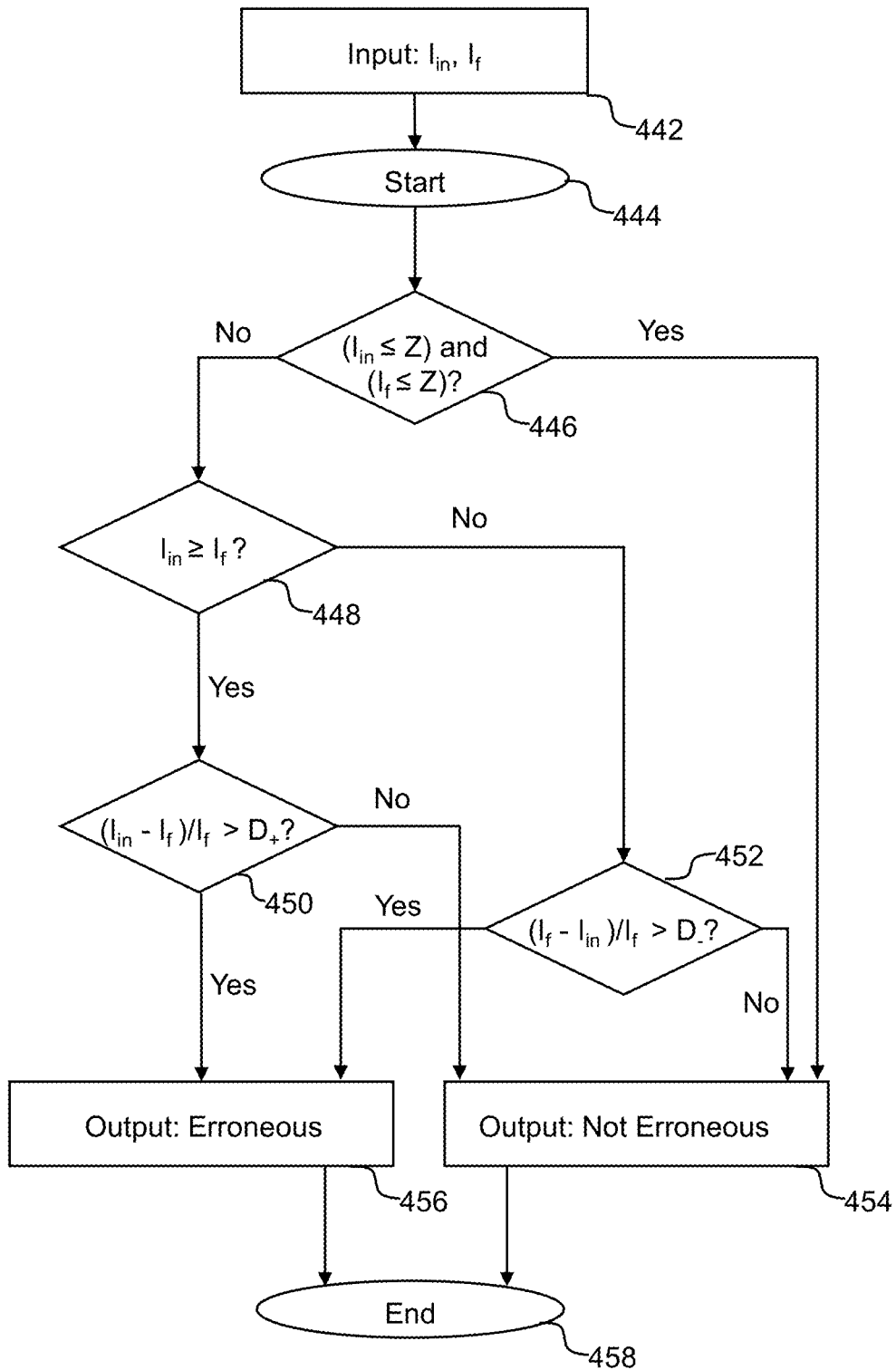
FIG. 4 is a flow diagram schematically illustrating an image processing algorithm according to an example.

Referring to FIG. 4, there is a flow diagram illustrating an embodiment of an algorithm that may be used to determine whether or not to categorize a pixel of the medical image as an erroneous pixel, as per step 108 of the method described above with reference to FIG. 1. The algorithm illustrated in FIG. 4 may be applied to each of the first plurality of pixels of the medical image received as in step 102 of the method described above with reference to FIG. 1.

For each of the plurality of first pixels, in block 442, the initial pixel value $I_n$ and the filtered pixel value $I_f$ for the pixel (as generated in step 104 of the method described above with reference to FIG. 1) is obtained. The algorithm is then initiated at block 444 and moves to block 446.

At block 446, the algorithm compares both the initial pixel value $I_n$ and the filtered pixel value $I_f$ to a third threshold Z. Specifically, the initial pixel value $I_n$ and the filtered pixel value $I_f$ are used to answer the question "$(I_{in} \leq Z)$ and $(I_f \leq Z)$?". If the answer to this question is "yes", then it is determined that the pixel is not an erroneous pixel, and the algorithm moves to block 454 where the pixel is categorized as not an erroneous pixel. Accordingly, the determination that the pixel is not to be categorized as an erroneous pixel is performed responsive to the comparison of both the initial pixel value $I_n$ and the filtered pixel value $I_f$ to the third threshold Z in the case that both the initial pixel value $I_n$ and the filtered pixel value $I_f$ is less than or equal to the third threshold Z. However, if the answer to the question is "no", the algorithm moves to other blocks (e.g. blocks 450 and 452 via block 448) where the initial pixel value $I_n$ is compared with the filtered pixel value $I_f$ as described in more detail below. According to block 446 therefore, the comparison of the initial pixel value $I_n$ with the filtered pixel value $I_f$ is performed responsive to the comparison of both the initial pixel value $I_n$ and the filtered pixel value $I_f$ to the third threshold Z in the case that at least one of the initial pixel value $I_n$ and the filtered pixel value $I_f$ is greater than the third threshold Z.

Accordingly, block 446 may act as an initial step to qualify a given pixel as a potentially erroneous, as compared to background: If both of the initial pixel value $I_n$ and the filtered pixel value $I_f$ are less than or equal to the third threshold Z (which e.g. may be set as a relatively low value, e.g. a value representative of a background signal in the medical imaging), then the pixel is likely to represent background and therefore it can be immediately determined that the pixel is not an erroneous pixel. However, if one or both of the initial pixel value $I_n$ and the filtered pixel value $I_f$ are greater than the third threshold Z, then the pixel is unlikely to represent background and therefore is potentially erroneous and hence the comparison of the initial pixel value and the filtered pixel value should proceed. Block 446 may therefore allow for the comparison to be applied more selectively to the pixels, thereby providing for more efficient processing of the image.

It will be appreciated that in some embodiments (not shown) block 446 may be omitted and instead the algorithm may pass directly from block 444 to block 448, for example.

Returning to the embodiment illustrated in FIG. 4, if the answer to the question in block 446 is "no", then the algorithm moves to block 448, where it is determined whether the initial pixel value $I_n$ is greater than or equal to the filtered pixel value $I_f$. Specifically, the question is asked "$I_{in} \geq I_f$?".

If the initial pixel value $I_{in}$ is greater than or equal to the filtered pixel value $I_f$ (i.e. if the answer to the question in block 448 is "yes"), then the algorithm moves to block 450 in which a first parameter $(I_{in} - I_f)/I_f$ indicative of a calculated difference between the initial pixel value $I_{in}$ and the filtered pixel value $I_f$ is compared to a first threshold $D_+$. If the initial pixel value $I_{in}$ is less than the filtered pixel value $I_f$ (i.e. if the answer to the question in block 448 is "no"), then the algorithm moves to block 452 in which a second parameter $(I_f - I_{in})/I_f$ indicative of a calculated difference between the initial pixel value $I_{in}$ and the filtered pixel value $I_f$ is compared to a second threshold $D_-$.

The blocks 448, 450, and 452 may provide for "light" pixels (i.e. pixels for which $I_{in} \geq I_f$) to be assessed differently to "dark" pixels (i.e. pixels for which $I_{in} < I_f$). Specifically, the blocks 450 and 452 allow for a difference in the thresholds ($D_+$ and $D_-$) against which "light" and "dark" erroneous pixels can be identified. For example, the first threshold $D_+$ may be set a to a different value to the second threshold $D_-$. This may be useful for example to take account of the fact that "dark" erroneous pixels (i.e. pixels which have an unusually low pixel value compared to their surrounding pixels) may differ in initial and filtered pixel value differently than "light" erroneous pixels (i.e. pixels that have an unusually high pixel value compared to their surrounding pixels). For example, this difference may be dependent on the overall brightness of the medical image, and the different first and second thresholds $D_+$, $D_-$ may be determined and set on this basis. Accordingly, blocks 448, 450 and 452 may allow for both "dark" erroneous pixels and "light" erroneous pixels to be reliably identified in the same image.

Returning to FIG. 4, in both blocks 450 and 452, the comparison of the initial pixel value $I_{in}$ with the filtered pixel value $I_f$ comprises calculating a difference between the initial pixel value $I_{in}$ and the filtered pixel value $I_f$. Specifically, in the case of block 450 (i.e. where $I_{in} \geq I_f$), the calculated difference is $I_{in}-I_f$, i.e. the initial pixel value $I_{in}$ less the filtered pixel $I_f$. In the case of block 452 (i.e. where $I_{in}<I_f$) the calculated difference is $I_f-I_{in}$, i.e. the filtered pixel $I_f$ less the initial pixel value $I_{in}$. This provides that the calculated difference is positive.

Further, in both blocks 450 and 452, the determination of whether or not the pixel is to be categorized as an erroneous pixel includes comparing a parameter indicative of the calculated difference to a threshold, and in response to the parameter being larger than the threshold, determining that the pixel is to be categorized as an erroneous pixel. Specifically, in the case of block 450, the first parameter $(I_{in}-I_f)/I_f$ is compared to the second threshold $D_+$, and in the case of block 452, the second parameter $(I_f-I_{in})/I_f$ is compared to the second threshold $D_-$. The first parameter $(I_{in}-I_f)/I_f$ and the second parameter $(I_f-I_{in})/I_f$ includes a calculated difference between the initial pixel value $I_{in}$ and the filtered pixel value $I_f$ as a proportion of the filtered pixel value $I_f$. In each case, this scales the calculated difference to how high/low the filtered pixel value $I_f$ is. This may allow for erroneous pixels to be reliably identified independent of how relatively dark or light the particular area of the medical images is.

Focusing specifically on block 450, the question is asked "$(I_{in}-I_f)/I_f>D_+$?". If the answer to the question is "yes", then the pixel is determined as an erroneous pixel and the algorithm moves to block 456 in which the pixel is categorized as an erroneous pixel. If the answer to the question in block 450 is "no", then the pixel is determined as not an erroneous pixel and the algorithm moves to block 454 in which the pixel is categorized as a not erroneous pixel. The categorization of the pixel in either case is output and the algorithm ends at block 458 for that pixel.

Focusing specifically on block 452, the question is asked "$((I_f-I_{in})/I_f)>D_-$?". If the answer to the question is "yes", then the pixel is determined as an erroneous pixel and the algorithm moves to block 456 in which the pixel is categorized as an erroneous pixel. If the answer to the question in block 452 is "no", then the pixel is determined as not an erroneous pixel and the algorithm moves to block 454 in which the pixel is categorized as a not erroneous pixel. The categorization of the pixel in either case is output and the algorithm ends at block 458 for that pixel.

It will be appreciated that in some examples (not shown), block 448 may be omitted and/or blocks 450 and 452 replaced with a single block (not shown) in which the initial pixel value $I_{in}$ is compared to the filtered pixel value $I_f$, for example where the modulus of a difference between the initial pixel value $I_{in}$ and the filtered pixel value $I_f$ is compared to a single threshold (not shown). In these cases, for example, if the difference is larger than the single threshold (not shown) the pixel may be determined and categorized as erroneous, whereas if the difference is smaller than the single threshold (not shown) the pixel may be determined as not an erroneous pixel.

In any case, the algorithm may be repeated for each of a plurality of pixels of the medical image. According to the algorithm, it can be reliably determined for each pixel whether or not the pixel is an erroneous pixel (e.g. represents noise). Pixels determined as erroneous can be categorized as such. Providing categorization of erroneous pixels in a medical image may have many uses and may allow for many advantages, some of which are described in more detail herein below.

The categorization of the erroneous pixels in the medical image can be used to generate a result image, corresponding to the medical image. For example, for each of the first plurality of pixels of the medical image not categorized as an erroneous pixel, the initial pixel value $I_{in}$ of the pixel of the medical image may be used as the pixel value of the corresponding pixel in the result image. However, for each of the first plurality of pixels of the medical image categorized as an erroneous pixel, the initial pixel value $I_{in}$ may be replaced in the result image with the filtered pixel value $I_f$. Accordingly, a result image may be generated with reduced erroneous pixels as compared to the medical image, e.g. a result image may be generated that exhibits reduced noise as compared to the medical image.

Specifically, for erroneous pixels, the initial pixel value is not correct in that it is not representative of the subject of the medical image but rather e.g. noise. However, for that erroneous pixel, the filtered pixel value is determined based on pixel values of pixels surrounding the erroneous pixel (e.g. using median filtering) and hence the filtered pixel value represents the surrounding pixels. This filtered pixel value therefore represents an estimate of the correct pixel value that the erroneous pixel would have had but for the error (e.g. noise). Accordingly, a result image may be generated with reduced erroneous pixels (e.g. reduced noise) as compared to the medical image, i.e. an error/noise corrected medical image may be provided for.

The result image may therefore be clearer for a radiologist to interpret as compared to the medical image, and hence may provide for accurate diagnosis.

Figure 3:
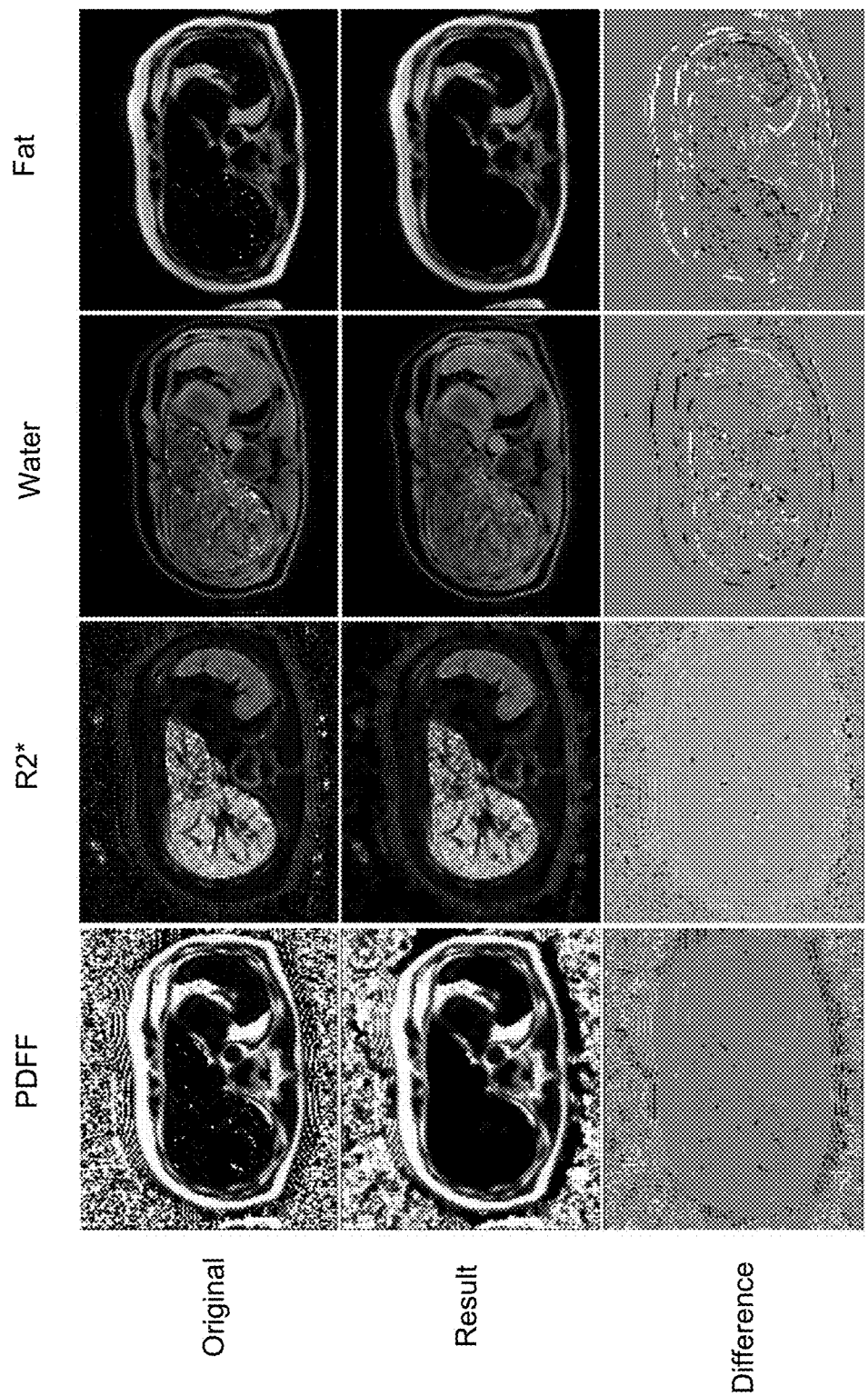
FIG. 3 is a table illustrating medical images according to an example.

Referring to FIG. 3, there is shown a table that illustrates medical images and corresponding result images according to examples. Specifically, the table of FIG. 3 has four columns labelled "PDFF", "$R_2$*", "Water", and "Fat" which correspond respectively to images showing the Proton Density Fat Fraction, the $R_2$* biomarker, water, and fat distribution in the region of a liver of a patient, as obtained from MRI imaging. In each case, the first row labelled "Original" shows the medical image, having the initial pixel values. The second row labelled "Result" shows the corresponding result image for the medical image in the first row, generated as described above. As can be seen, noise present in the "original" medical images is reduced in the corresponding result image. Indeed, the third row of the table of FIG. 3, labelled "Difference", shows the difference between the "original" medical image and the result image for each column (i.e. the "result" image subtracted from the "original" image). This demonstrates the marked difference that the corrections of the erroneous pixels can make.

The result image may have many other uses and advantages, for example to allow more stable parameter fitting and to allow for training of a neural network to reduce noise in medical images, which are described in more detail below.

Specifically, the result image may be used to provide for more stable parameter fitting when fitting a medical imaging signal to a signal model, for example as described in the following.

The pixel values of each pixel of the medical image may be derived from a medical imaging signal. For example, as is known, in gradient echo MRI, for each voxel corresponding to a pixel in a medical image, the signal may comprise a Magnetic Resonance spectrum S detected at the voxel. The spectrum S may be modelled using the model equation:

$$S=(M_w+c_n M_f)e^{-R_2^* TE_n} \qquad (1)$$

where $M_w$ is the magnetization due to water, $M_f$ is the magnetization due to fat, $R_2$* is the reciprocal of the spin relaxation rate, $TE_n$ is the n-th echo time, and $c_n$ is the complex coefficient at $TE_n$ due to the difference of fat and water in the spectrum. If an initial magnetization $M_0$ is defined as $M_0=M_w+M_f$ and a fat fraction FF is defined as $FF=M_f/M_0$, then equation (1) can be re-written in the simple form of the model equation:

$$S=M_0[(1-FF)+c_n FF]e^{-R_2^* TE_n} \qquad (2)$$

In equation (2), the parameters $M_0$, FF, and $R_2^*$ are free parameters of the model which are fitted to the gradient echo magnetic resonance spectrum obtained for a given voxel. Once these parameters are fitted, for example two medical images can be produced: a Fat Fraction image (i.e. a Fat Fraction biomarker map) and an $R_2^*$ image (i.e. an $R_2^*$ biomarker map). For each pixel in the image, the Fat Fraction image uses the value of the parameter FF determined for the pixel as the pixel value, whereas the $R_2^*$ image uses the value of the parameter $R_2^*$ determined for the pixel as the pixel value.

The image processing as described above may be applied to one of these images (e.g. the Fat Fraction image) so as to generate a result image as described above, in which, for each pixel categorized as an erroneous pixel, the initial pixel value is replaced by the filtered value. Accordingly, a Fat Fraction result image is produced with reduced erroneous pixel values, e.g. reduced noise. The pixel values of this Fat Fraction result image can then be used as a fixed parameter in the signal model applied to the medical imaging signal. For example, for each pixel, the signal may be refitted to the signal model of equation (2) except with the FF parameter being fixed at the value of the pixel of the Fat Fraction result image, as opposed to being a free parameter as per $M_0$ and $R_2^*$.

As a result, the $R_2^*$ parameter can be determined for each pixel (and the $R_2^*$ image thereby generated) based on FF parameter values in which erroneous pixel values have been corrected (i.e. the noise reduced). This may allow for more accurate determination of $R_2^*$, and hence an improved $R_2^*$ image.

Moreover, and in any case, the signal may be fitted to the signal model with fewer free parameters (e.g. where only $M_0$ and $R_2^*$ are free parameters but FF is fixed). An advantage of using a signal model with fewer free parameters is that the remaining free parameters can be determined more stably. Accordingly, the remaining free parameters, i.e. $R_2^*$ in this example, a more stable and potentially more accurate value can be determined. Accordingly, images produced from the remaining free parameters, i.e. $R_2^*$ in this example, may be more reliable and/or accurate.

More generally, in some embodiments, for each pixel of the medical image, the value of the pixel may have been derived from the value of a first parameter (e.g. FF) of a signal model (e.g. equation (2)) applied to a medical imaging signal (e.g. S), the signal model may include the first parameter (FF) and one or more second parameters (e.g. $R_2^*$), each of the first parameter (FF) and the one or more second parameters ($R_2^*$) may have been fitted to the medical imaging signal of a region of space associated with the pixel. In some embodiments, the method may include, for each pixel of the medical image, re-applying the signal model (equation (2)) to the medical imaging signal to re-fit the one or more second parameters ($R_2^*$) of the signal model to the medical imaging signal of the region of space associated with the pixel whilst fixing the value of the first parameter (FF) as the value of the corresponding pixel of the result image.

The result image may also be used to train a neural network to reduce noise in medical images, for example as described in the following.

The method described above for generating a result image may be applied to a plurality of medical images, thereby generating a respective plurality of the result images. For example, the image processing may be applied to many hundreds or thousands of medical images to generate corresponding result images in which erroneous pixel values are corrected (e.g. in which the noise is reduced), as described above. The method may comprise collating the plurality of medical images and the respective plurality of result images into a training data set in which each respective result image is associated with the respective medical image to which the result image corresponds. The method may then include using the training data set to train a neural network to estimate a result image given a medical image as input.

For example, the neural network may be a deep learning network. For example, the neural network may include a convolutional neural network comprising an input layer, one or more hidden layers, and an output layer. Training the neural network may be by supervised learning. For example, a medical image may be used as a training input, and the corresponding generated result image used as a supervisory signal, to train the neural network. For example, each medical image may be transformed into a input vector of pixel values of the pixels of the medical image, and the neural network may be arranged and trained (e.g. the weights of the neurons in the one or more hidden layers adjusted) to map this input vector onto a corresponding vector representative of the corresponding generated result image of the training data set. This may be repeated recursively for each medical image and associated result image of the training data set. As a result, a trained neural network may be generated that is trained to take as input medical images and output result images in which erroneous pixels have been corrected, e.g. in which noise has been reduced. One example of a neural network that may be used is a U-Net in which a contracting path including a convolutional network is followed by an expansive path comprising a sequence of up-convolutions. In this example, the training data provided to the U-Net may be the medical images and result images themselves rather than vectors comprising all of the pixel values of those images.

Training a neural network in this way may provide for the generation of result images in which erroneous pixels are corrected (e.g. in which noise is reduced) but without needing to employ the image processing described above e.g. with reference to FIG. 1. This may allow for faster and or more efficient generation of such result images.

The categorization of the erroneous pixels in the medical image, i.e. as described above with reference to FIG. 1, may also be used to generate an erroneous pixel indicator image. For example, for each of the first plurality of pixels of the medical image categorized as an erroneous pixel, a first given value may be used as the pixel value of the corresponding pixel in the erroneous pixel indicator image; and for each of the first plurality of pixels of the medical image not categorized as an erroneous pixel, a second given value different from the first given value may be used as the pixel value of the corresponding pixel in the erroneous pixel indicator image. As such, the generated erroneous pixel indicator image may encode, through the first and second given values, which pixels of a medical image are erroneous and which pixels are not erroneous. For example, the first given value may be 1, and the second given value may be 0. Accordingly, a binary image indicating erroneous pixels may be provided for. The erroneous pixel indicator image may allow for a clear and immediate evaluation of those pixels of the medical image that are erroneous, which may for example help a radiologist appreciate those pixels that are erroneous, e.g. represent noise.

The erroneous pixel indicator image may have many other uses and advantages, for example to allow for a simple and computationally efficient way to implement the generation of the result image and to allow for training of a neural network to identify noise in medical images, which are described in more detail below.

The erroneous pixel indicator image may be used in the implantation of the generation of the result image. For example, referring now to FIG. 2, there is illustrated a flow diagram of an example method to generate a result image 226.

First, a medical image 220 is obtained. The medical image has a first plurality of pixels each having an initial pixel value $I_{in}$. A filtering operation 230 is applied to the medical image 230 to produce a filtered image 222. Specifically, the filtering operation comprises applying step 104 of the method described above with reference to FIG. 1 to each of the first plurality of pixels of the medical image. As such, each pixel of the filtered image 222 has a filtered pixel value $I_f$.

Next, an erroneous pixel indicator image generating operation 232 is applied to the medical image 220 and the filtered image 222, to generate an erroneous pixel indicator image 224. Specifically, the steps 106 to 110 of the method described above with reference to FIG. 1 are applied to each pixel of the medical image 220 to categorize each pixel as erroneous. For each pixel categorized as erroneous a first pixel value of 1 is assigned for the corresponding pixel in the erroneous pixel indicator image 224, and for each pixel not categorized as erroneous a second pixel value of 0 is assigned for the corresponding pixel in the erroneous pixel indicator image 224. The erroneous pixel indicator image 224 is therefore a binary image that illustrates those pixels of the medical image 220 that are erroneous, e.g. correspond to noise.

At block 238, the erroneous pixel indicator image 224 and the filtered image 222 are multiplied together. That is, for each pixel, the pixel value of the pixel in the erroneous pixel indicator image 224 is multiplied by the pixel value of the pixel in the filtered image 222. Since in the erroneous pixel indicator image, the erroneous pixels have a value of 1 and otherwise a value of 0, the result of the multiplication will be the pixel value of the filtered image 222 for erroneous pixels, and otherwise 0.

At block 234, the pixel values of each of the pixels of the erroneous pixel indicator image are multiplied by −1 and then increased by 1. This, in effect produces an inverted erroneous pixel indicator image (not shown). At block 236, the inverted erroneous pixel indicator image (not shown) and the medical image 220 are multiplied together. That is, for each pixel, the pixel value of the pixel in the inverted erroneous pixel indicator image (not shown) is multiplied by the pixel value of the pixel in the medical image 220. Since in the inverted erroneous pixel indicator image, the non-erroneous pixels have a value of 1 and otherwise a value of 0, the result of the multiplication will be the pixel value of the filtered image 222 for non-erroneous pixels, and otherwise 0.

At block 240, the image resulting from the multiplication at block 238 and the image resulting from the multiplication at block 236 are added together to generate the result image 226. Accordingly, in the result image 226, pixels that correspond to pixels of the medical image 220 that were categorized as erroneous are given the filtered pixel value as the pixel value, and pixels that correspond to the pixels of the medical image 220 that not categorized as erroneous are given the initial pixel value as the pixel value. Accordingly, the result image in which erroneous pixels are corrected for (e.g. noise in the medical image is reduced) is provided.

Basing the generation of the result image on the erroneous pixel indicator image as described above allows for a simple and computationally efficient way to implement the generation of the result image, i.e. through multiplication and addition operations which may be relatively simply and computationally efficient to implement.

The erroneous pixel indicator image may also be used to train a neural network to reduce noise in medical images, for example as described in the following.

The method described above for generating an erroneous pixel indicator image may be applied to a plurality of medical images, thereby generating a respective plurality of the erroneous pixel indicator images. For example, the image processing may be applied to many hundreds or thousands of medical images to generate corresponding erroneous pixel indicator images in which erroneous pixels are indicated, as described above. The method may include collating the plurality of medical images and the respective plurality of erroneous pixel indicator images into a training data set in which each respective erroneous pixel indicator image is associated with the respective medical image to which the erroneous pixel indicator image corresponds. The method may then include using the training data set to train a neural network to estimate a said erroneous pixel indicator image given a said medical image as input.

For example, the neural network may be a deep learning network comprising multiple layers between its input and output layers. For example, the neural network may include a convolutional neural network having an input layer, one or more hidden layers, and an output layer. Training the neural network may be by supervised learning. For example, a medical image may be used as a training input, and the corresponding generated erroneous pixel indicator image used as a supervisory signal, to train the neural network. For example, each medical image may be transformed into an input vector of pixel values of the pixels of the medical image, and the neural network may be arranged and trained (e.g. the weights of the neurons in the one or more hidden layers adjusted) to map this input vector onto a corresponding vector representative of the corresponding generated erroneous pixel indicator image of the training data set. This may be repeated recursively for each medical image and associated erroneous pixel indicator image of the training data set. As a result, a trained neural network may be generated that is trained to take as input medical images and output erroneous pixel indicator images in which erroneous pixels have a first given pixel value (e.g. 1) and non-erroneous pixels have a second given pixel value (e.g. 0). One example of a neural network that may be used is a U-Net in which a contracting path comprising a convolutional network is followed by an expansive path comprising a sequence of up-convolutions. In this example, the training data provided to the U-Net may be the medical images and erroneous pixel indicator images themselves rather than vectors comprising all of the pixel values of those images.

Training a neural network in this way may provide for the generation of erroneous pixel indicator images in which erroneous pixels are indicated but without needing to employ the pixel value comparisons and/or image processing described above e.g. with reference to FIG. 1. This may, for example, in turn, provide for result images to be generated without the processing involved in calculating differences in pixel values, which may provide for faster and/or more efficient generation of result images.

Embodiments disclosed herein (see e.g. FIG. 2) provide for an adaptive local filtering algorithm or method that can correct noisy pixel values in medical images. The method is adaptive in the sense that pixel value correction is applied only to some of the pixels, specifically, those categorized as erroneous. This allows for the values of the pixels that are not erroneous to persist in the result image, thereby providing that the result image is faithful to the medical image but for the erroneous pixels/noise. A major component of the noise that may result in erroneous pixels as described herein is thermal noise, and hence the adaptive local filtering algorithm or method disclosed herein may provide for reduced thermal noise in medical images. The method is local in the sense that the filtered pixel value determined for an erroneous pixel is determined based on the values of pixels that surround the erroneous pixel in the medical image.

It has been demonstrated (see e.g. FIG. 3) that the method can provide improved image appearance and pixel values for PDFF and R2* biomarker maps for the assessment of PDFF and R2* in liver. However, it will be appreciated that this method can be used for other MR images including T1, T2/R2 related maps, or indeed any medical image. Similarly, it will be appreciated that although gradient echo MRI is referred to above, the method can be applied to other sequence types of MRI such as spin echo sequences and balanced steady state free precession sequences. Indeed, as mentioned, the method may be applied to any medical image. Similarly, although median filtering is referred to above, it will be appreciated that other local filters (i.e. where the filter value for a given pixel is calculated based on the pixel values of pixels surrounding e.g. local to, the given pixel) may be used. Edge preserving filters provide for sharp result images, but in principle any such local filtering operation may be used.

Figure 5:
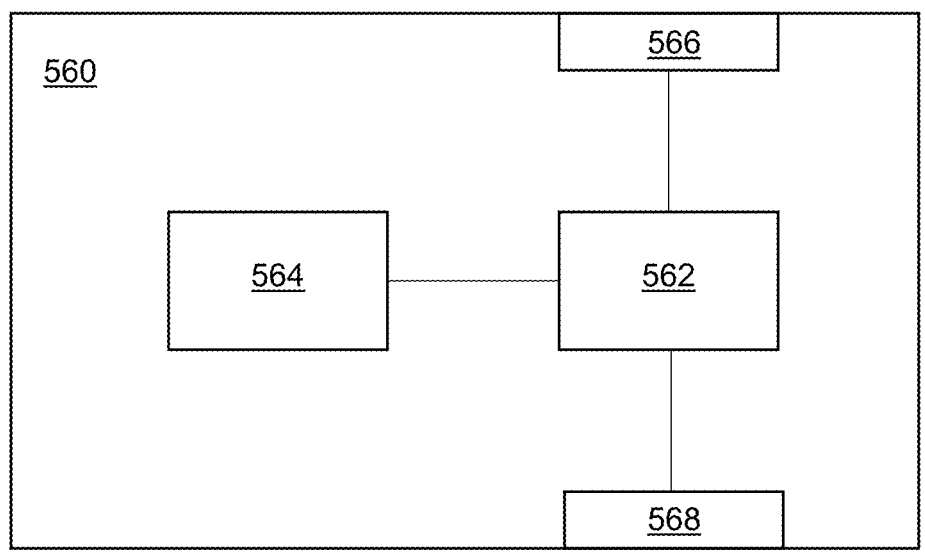
FIG. 5 is a schematic diagram illustrating an apparatus according to an example.

Referring to FIG. 5, there is illustrated an apparatus 560 according to an embodiment. The apparatus 560 comprises an input interface 566, an output interface 568, a processor 562, and a memory 564. The processor 562 and the memory 564 may be configured to perform the method according to any one of the examples described above with reference to FIGS. 1 to 4. The memory may store instructions which, when executed by the processor 562 case the processor 562 to perform the method according to any one of the embodiments described above with reference to FIGS. 1 to 4.

In an embodiment, the input interface 566 may receive a medical image, the processor 562 may implement the method described above with reference to FIG. 1 to the medical image, and the processor 562 may output, via the output interface 568, data representing the pixels of the medical image categorized as erroneous, for example in the form of an erroneous pixel indicator image as described above. In another embodiment, the processor 562 may implement the method described above with reference to FIG. 2 to the medical image, and the processor 562 may output, via the output interface 568, the result image, or data representing the result image. In another embodiment, the input interface 566 may receive a training data set as per any one of the embodiments described above, the processor 562 may implement training of a neural network as per any one of the embodiments described above, and the processor 562 may output, via the output interface 568, the trained neural network or data representing the trained neural network. In another embodiment, the input interface 566 may receive a medical image, the processor 562 may implement a trained neural network, i.e. trained as per one of the examples described above, to the medical image to generate a result image or erroneous pixel indicator image as per one of the embodiments described above. The apparatus 560 may be implemented as a processing system and a computer.

It will be appreciated that the method according to any one of the embodiments described above with reference to FIGS. 1 to 4 may be a computer implemented method, and that this method may be implemented by the apparatus 560.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

We claim:

1. A computer implemented method of processing a medical image, the method comprising:
   receiving a medical image comprising a first plurality of pixels each having an initial pixel value;
   for each of the first plurality of pixels, applying a filtering operation to the pixel to generate a filtered pixel value for the pixel based on the initial pixel values of pixels that surround the pixel in the medical image;
   for each of the first plurality of pixels,
      performing a comparison of the initial pixel value with the filtered pixel value, the comparison including
         comparing a first parameter indicative of a difference between the initial pixel value and the filtered pixel value to a first threshold in response to determining that the initial pixel value is greater than or equal to the filtered pixel value, and
         comparing a second parameter indicative of a difference between the filtered pixel value and the initial pixel value to a second threshold in response to determining that the initial pixel value is less than the filtered pixel value;
   determining, based on the comparison, a plurality of erroneous pixels; and
   determining, based on the comparison, a plurality of non-erroneous pixels.

2. The method of claim 1, wherein the method further comprises:
   generating a result image corresponding to the medical image, wherein each of the plurality of erroneous pixels and each of the plurality of non-erroneous pixels have a corresponding pixel having a pixel value in the result image, wherein generating the result image comprises:
   using the filtered pixel value of the pixel of the medical image as the pixel value of the corresponding pixel in the result image.

3. The method of claim 2, wherein generating the result image comprises:
   for each of the plurality of non-erroneous pixels, using the initial pixel value (fin) of the pixel of the medical image as the pixel value of the corresponding pixel in the result image.

4. The method of claim 3, wherein the method further comprises:
   for each of the first plurality of pixels of the medical image, using the pixel value of the corresponding pixel of the result image as a fixed parameter in a signal model applied to a medical imaging signal, wherein the initial pixel value is derived from the medical imaging signal.

5. The method of claim 3, wherein the method further comprises:
applying the method of claim 3 to a plurality of medical images thereby to generate a respective plurality of the result images;
collating the plurality of medical images and the respective plurality of the result images into a training data set in which each respective result image is associated with the respective medical image to which the result image corresponds; and
using the training data set to train a neural network to estimate a result image given a medical image as input.

6. The method of claim 1, wherein the method further comprises:
generating an erroneous pixel indicator image corresponding to the medical image, wherein each of the plurality of erroneous pixels and each of the plurality of non-erroneous pixels have a corresponding pixel having a pixel value in the erroneous pixel indicator image, wherein generating the erroneous pixel indicator image comprises:
for each of the plurality of erroneous pixels, using a first given value as the pixel value of the corresponding pixel in the erroneous pixel indicator image; and
for each of the plurality of non-erroneous pixels, using a second given value different from the first given value as the pixel value of the corresponding pixel in the erroneous pixel indicator image.

7. The method of claim 6, wherein the method further comprises:
applying the method according to claim 6 to a plurality of medical images thereby to generate a respective plurality of the erroneous pixel indicator images;
collating the plurality of medical images and the respective plurality of the erroneous pixel indicator images into a training data set in which each respective erroneous pixel indicator image is associated with the respective medical image to which the erroneous pixel indicator image corresponds; and
training a neural network, using the training data set, to estimate an erroneous pixel indicator image given a medical image as input.

8. The method of claim 1, wherein the determination of the plurality of erroneous pixels comprises:
in response to the first parameter being larger than the first threshold determining that the pixel is to be categorized as an erroneous pixel, and
in response to the second parameter being larger than the second threshold determining that the pixel is to be categorized as an erroneous pixel.

9. The method of claim 1, wherein the first parameter comprises a difference between the initial pixel value and the filtered pixel value as a proportion of the filtered pixel value (If) and the second parameter comprises a difference between the filtered pixel value and the initial pixel value as a proportion of the filtered pixel value.

10. The method of claim 1, wherein the method further comprises:
for each of the first plurality of pixels, comparing both the initial pixel value and the filtered pixel value to a third threshold,
wherein the comparison of the initial pixel value with the filtered pixel value is performed responsive to the comparison of both the initial pixel value and the filtered pixel value to the third threshold when at least one of the initial pixel value and the filtered pixel value is greater than the third threshold.

11. The method of claim 10, wherein the method further comprises:
responsive to the comparison of both the initial pixel value and the filtered pixel value to the third threshold when both the initial pixel value and the filtered pixel value is less than or equal to the third threshold, determining that the pixel is not to be categorized as an erroneous pixel.

12. An apparatus for processing a medical image comprising a processor configured to:
receive a medical image comprising a first plurality of pixels each having an initial pixel value;
for each of the first plurality of pixels, apply a filtering operation to the pixel to generate a filtered pixel value for the pixel based on the initial pixel values of pixels that surround the pixel in the medical image;
for each of the first plurality of pixels,
perform a comparison of the initial pixel value with the filtered pixel value, the comparison including
comparing a first parameter indicative of the initial pixel value less the filtered pixel value to a first threshold in response to determining that the initial pixel value is greater than or equal to the filtered pixel value, and
comparing a second parameter indicative of the filtered pixel value less the initial pixel value to a second threshold in response to determining that the initial pixel value is less than the filtered pixel value;
determine, based on the comparison, a plurality of erroneous pixels; and
determine, based on the comparison, a plurality of non-erroneous pixels.

13. The apparatus of claim 12, wherein the processor is further configured to:
generate a result image corresponding to the medical image, wherein each of the plurality of erroneous pixels and each of the plurality of non-erroneous pixels have a corresponding pixel having a pixel value in the result image, wherein generating the result image comprises:
for each of the plurality of erroneous pixels, using the filtered pixel value of the pixel of the medical image as the pixel value of the corresponding pixel in the result image.

14. The apparatus of claim 13, wherein generating the result image comprises:
for each of the plurality of non-erroneous pixels, using the initial pixel value of the pixel of the medical image as the pixel value of the corresponding pixel in the result image.

15. The apparatus of claim 12, wherein the determination of the plurality of erroneous pixels comprises:
in response to the first parameter being larger than the first threshold, determining that the pixel is to be categorized as an erroneous pixel, and
in response to the second parameter being larger than the second threshold, determining that the pixel is to be categorized as an erroneous pixel.

16. The apparatus of claim 14, wherein the processor is further configured to:
for each of the first plurality of pixels, compare both the initial pixel value and the filtered pixel value to a third threshold; and
wherein the comparison of the initial pixel value with the filtered pixel value is performed responsive to the comparison of both the initial pixel value and the filtered pixel value to the third threshold when at least one of the initial pixel value and the filtered pixel value is greater than the third threshold.

17. A computer program product for processing a medical image, the computer program product comprising a non-transitory computer readable storage medium having program instructions embodied therewith, the program instructions executable by a processor to cause the processor to:

receive a medical image comprising a first plurality of pixels each having an initial pixel value;

for each of the first plurality of pixels, apply a filtering operation to the pixel to generate a filtered pixel value for the pixel based on the initial pixel values of pixels that surround the pixel in the medical image;

for each of the first plurality of pixels, perform a comparison of the initial pixel value with the filtered pixel value, the comparison including comparing a first parameter indicative of a difference between the initial pixel value and the filtered pixel value to a first threshold in response to determining that the initial pixel value is greater than or equal to the filtered pixel value, and comparing a second parameter indicative of a difference between the filtered pixel value and the initial pixel value to a second threshold in response to determining that the initial pixel value is less than the filtered pixel value;

determine, based on the comparison, a plurality of erroneous pixels;

determine, based on the comparison, a plurality of non-erroneous pixels; and generate a result image corresponding to the medical image, wherein each of the plurality of erroneous pixels and each of the plurality of non-erroneous pixels have a corresponding pixel in the result image, wherein generating the result image comprises for each of the plurality of erroneous pixels, using the filtered pixel value of the pixel of the medical image as the pixel value of the corresponding pixel in the result image, and for each of the plurality of non-erroneous pixels, using the initial pixel value of the pixel of the medical image as the pixel value of the corresponding pixel in the result image.

* * * * *